United States Patent
Song et al.

(10) Patent No.: US 10,291,136 B2
(45) Date of Patent: May 14, 2019

(54) CONTROL DEVICE AND CONTROL METHOD

(71) Applicant: Delta Electronics (Shanghai) CO., LTD, Shanghai (CN)

(72) Inventors: Haibin Song, Shanghai (CN); Jinfa Zhang, Shanghai (CN); Daofei Xu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/944,820

(22) Filed: Apr. 4, 2018

(65) Prior Publication Data

US 2018/0294731 A1  Oct. 11, 2018

(30) Foreign Application Priority Data

Apr. 10, 2017 (CN) .......................... 2017 1 0229571
Jun. 30, 2017 (CN) .......................... 2017 1 0526927

(51) Int. Cl.
*H02M 3/335* (2006.01)
*H02M 1/00* (2006.01)

(52) U.S. Cl.
CPC ... *H02M 3/33523* (2013.01); *H02M 3/33569* (2013.01); *H02M 2001/0009* (2013.01); *Y02B 70/1475* (2013.01); *Y02B 70/1491* (2013.01)

(58) Field of Classification Search
CPC ......... H02M 3/33523; H02M 3/33569; H02M 3/33507; H02M 3/33515; H02M 3/33576; H02M 3/33592
USPC ......... 363/21.12, 21.13, 21.14, 21.15, 21.16, 363/21.17, 95, 97, 131
See application file for complete search history.

(56) References Cited

U.S. PATENT DOCUMENTS

| | | | | |
|---|---|---|---|---|
| 5,991,172 A | * | 11/1999 | Jovanovic | ........... H02M 1/4258 363/132 |
| 6,353,544 B1 | | 3/2002 | Lau | |
| 9,966,861 B1 | * | 5/2018 | Yeh | ........... H02M 3/33592 |
| 2010/0091525 A1 | * | 4/2010 | Lalithambika | ........... H02M 1/08 363/21.02 |
| 2013/0163290 A1 | * | 6/2013 | Moon | ........... H02M 3/33592 363/21.02 |
| 2014/0204625 A1 | | 7/2014 | Liu et al. | |
| 2017/0257033 A1 | * | 9/2017 | Liu | ........... H02M 3/33507 |

FOREIGN PATENT DOCUMENTS

TW    201535951 A    9/2015
TW    201640800 A    11/2016

OTHER PUBLICATIONS

The Taiwanese 1OA issued by TIPO dated Jun. 4, 2018.

* cited by examiner

*Primary Examiner* — Adolf D Berhane
(74) *Attorney, Agent, or Firm* — Yunling Ren

(57) ABSTRACT

A control device applied to a flyback converter including an auxiliary switch includes: a current detector configured to detect an amplitude of a current of the flyback converter to obtain an amplitude of a negative magnetizing current of the flyback converter; and a comparator controller configured to compare the amplitude of the negative magnetizing current obtained by the current detector with a reference value, and turn off the auxiliary switch according to a comparison result. According to the present disclosure, it is able to achieve zero-voltage switching of a primary-side switch of the flyback converter with variable outputs.

27 Claims, 14 Drawing Sheets

CONTROL DEVICE AND CONTROL METHOD

CROSS REFERENCE

This application is based upon and claims priority to Chinese Patent Application No. 201710229571.6, filed on Apr. 10, 2017, and Chinese Patent Application No. 201710526927.2, filed on Jun. 30, 2017 the entire contents thereof are incorporated herein by reference.

TECHNICAL FIELD

The present disclosure relates to the field of power electronic technologies, and more particularly, to a control device and control method applied to a flyback converter.

BACKGROUND

Flyback converter is widely adopted for low power off-line applications, such as notebook adapter, cell phone charger etc. Quasi-resonant (QR) flyback is particularly popular because of less switching loss. It operates in discontinuous current conduction mode, and achieves zero voltage switching (ZVS) at low line and partial hard switching at high line. Recently there is growing need for higher power density for adapters, and high switching frequency design accompanied by efficiency improvement is necessary to pass thermal requirement in a smaller volume. QR flyback typically operates below 150 kHz, and switching loss becomes dominant when switching frequency further increases, especially at high line condition. Soft switching flyback converter were introduced to run at higher switching frequency (300~1 MHz) with optimized efficiency. With new control method, QR flyback with synchronous rectifier (SR) can achieve ZVS for both low line and high line conditions. Before turning on the primary main switch, the SR is controlled to get inverse secondary side current, and then the inverse current is transferred to primary side to discharge parasitic capacitance of the primary main switch for ZVS. Active clamp flyback (ACF) is a two-switch topology that achieves soft switching. Operating in continuous current mode (CCM), or discontinuous current mode (DCM), it can achieve full ZVS, and furthermore, ACF recycles leakage inductance energy, which benefits both efficiency and device stress.

So far, soft switching flyback converter mentioned above is developed for fixed output voltage application. For wide range output applications such as USB PD adapter, ZVS may be lost, or efficiency may be degraded due to excessive circulation current.

Therefore, it is an urgent need at present to develop a control device and a control method that can overcome the above technical problems.

It is to be noted that the above information disclosed in this Background section is only for enhancement of understanding of the background of the present disclosure and therefore it may contain information that does not form the prior art that is already known to a person of ordinary skill in the art.

SUMMARY

An objective of the present disclosure is to provide a control device and a control method, so as to overcome, at least to a certain extent, one or more problems caused by limitation and defects of related technologies.

According to an aspect of the present disclosure, there is provided a control device applied to a flyback converter including an auxiliary switch. The control device includes: a current detector configured to detect an amplitude of a current of the flyback converter to obtain an amplitude of a negative magnetizing current of the flyback converter; and a comparator controller configured to compare the amplitude of the negative magnetizing current obtained by the current detector with a reference value, and turn off the auxiliary switch according to a comparison result.

According to an aspect of the present disclosure, there is provided a switching power supply, which includes the control device according to any one of the above embodiments.

According to an aspect of the present disclosure, there is provided a control method applied to a flyback converter including an auxiliary switch. The control method includes: detecting an amplitude of a current of the flyback converter to obtain an amplitude of a negative magnetizing current of the flyback converter; comparing the amplitude of the negative magnetizing current with a reference value; and turning off the auxiliary switch according to a comparison result to achieve zero-voltage switching of a primary-side power switch of the flyback converter.

According to the control device and the control method provided by the exemplary embodiments of the present disclosure, an amplitude of a negative magnetizing current is obtained by detecting an amplitude of a current of the flyback converter, the obtained amplitude of the negative magnetizing current is compared with a reference value, and turn-off of the auxiliary switch is controlled according to a comparison result. On the one hand, the amplitude of the negative magnetizing current is obtained by detecting the amplitude of the current of the flyback converter, such that the amplitude of the negative magnetizing current with different output voltages may be detected. On the other hand, the obtained amplitude of the negative magnetizing current is compared with the reference value, and turn-off of the auxiliary switch is controlled according to a comparison result, such that zero-voltage switching of a primary-side switch with different output voltages may be achieved by reasonably setting the reference value.

It should be understood that the above general description and the detailed description below are merely exemplary and explanatory, and do not limit the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
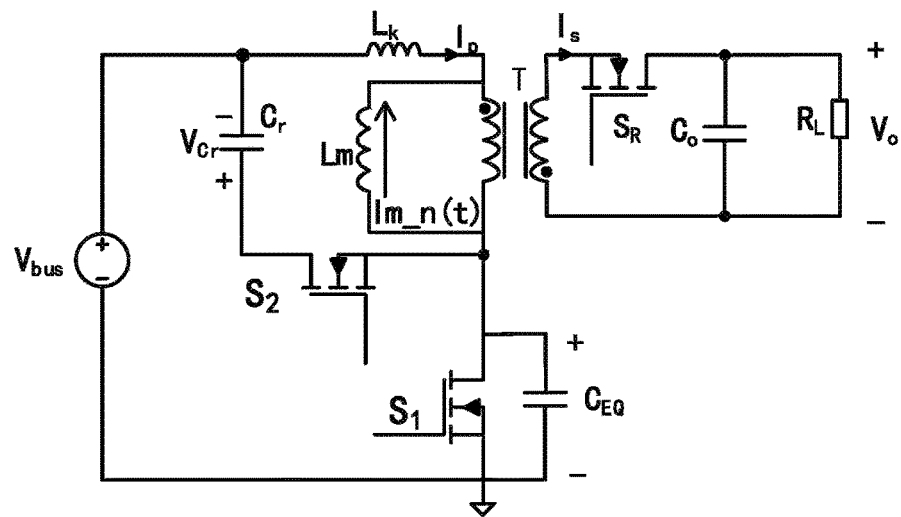
FIG. 1 schematically illustrates a circuit diagram of an active clamp flyback converter according to a typical structure.

The exemplary embodiments will now be described more fully with reference to the accompanying drawings. However, the exemplary embodiments can be implemented in a variety of forms and should not be construed as limited to the embodiments set forth herein. Rather, the embodiments are provided so that the present disclosure will be thorough and complete and will fully convey the concepts of exemplary embodiments to those skilled in the art. The features, structures, or characteristics described may be combined in one or more embodiments in any suitable manner. In the following description, numerous specific details are provided to give a full understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

In addition, the accompanying drawings are merely exemplary illustration of the present disclosure, and are not necessarily drawn to scale. The same reference numerals in the drawings denote the same or similar parts, and thus repeated description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

Figure 2:
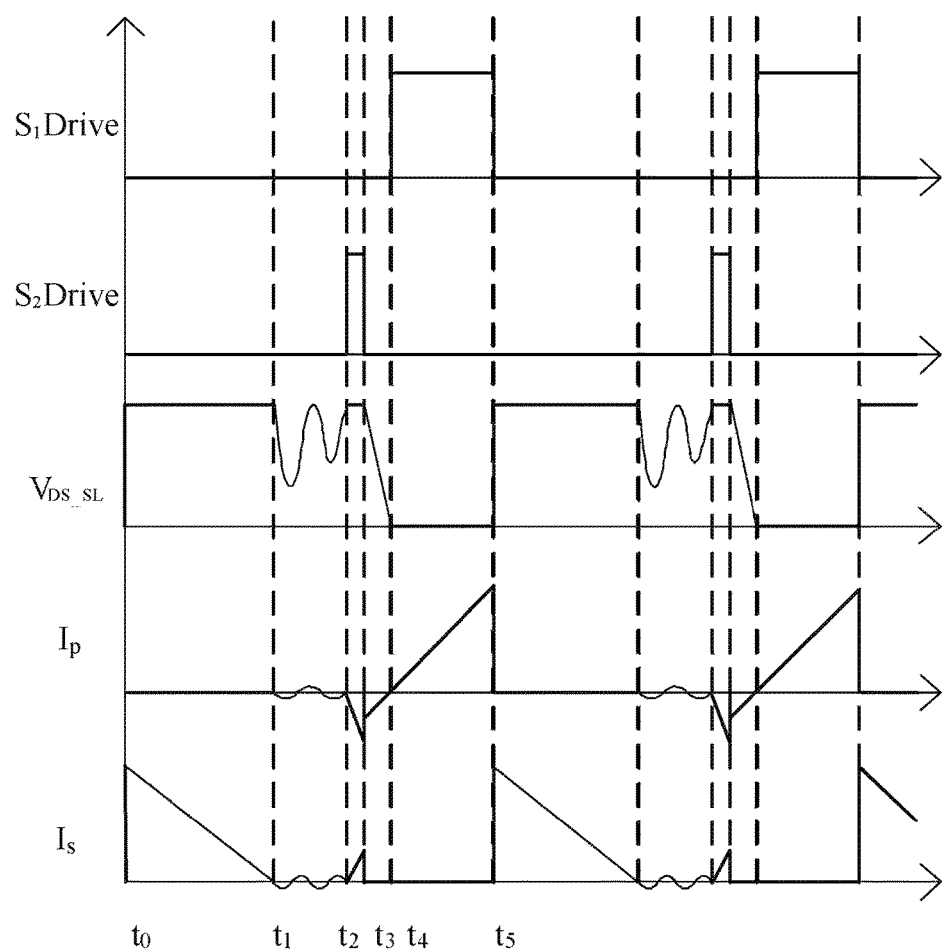
FIG. 2 schematically illustrates a non-complementary control waveform diagram of an active clamp flyback converter according to a typical structure.

FIG. 1 illustrates a circuit diagram of an active clamp flyback converter according to a typical structure, by which zero-voltage switching (ZVS) of a primary-side power switch $S_1$ may be achieved. An exemplary control method may be implemented by turning on a clamp switch $S_2$ for a set time (for example, $t_2$-$t_3$ in the control waveform diagram as shown in FIG. 2) only before the primary-side power switch $S_1$ is turned on.

Figure 3:
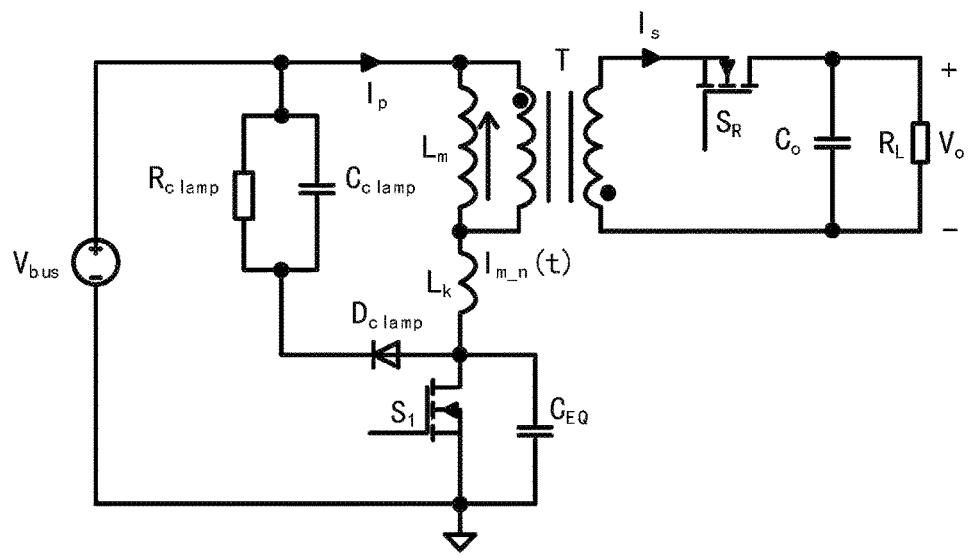
FIG. 3 schematically illustrates a circuit diagram of an RCD (Resistor Capacitor Diode) clamp flyback converter according to a typical structure.
Figure 4:
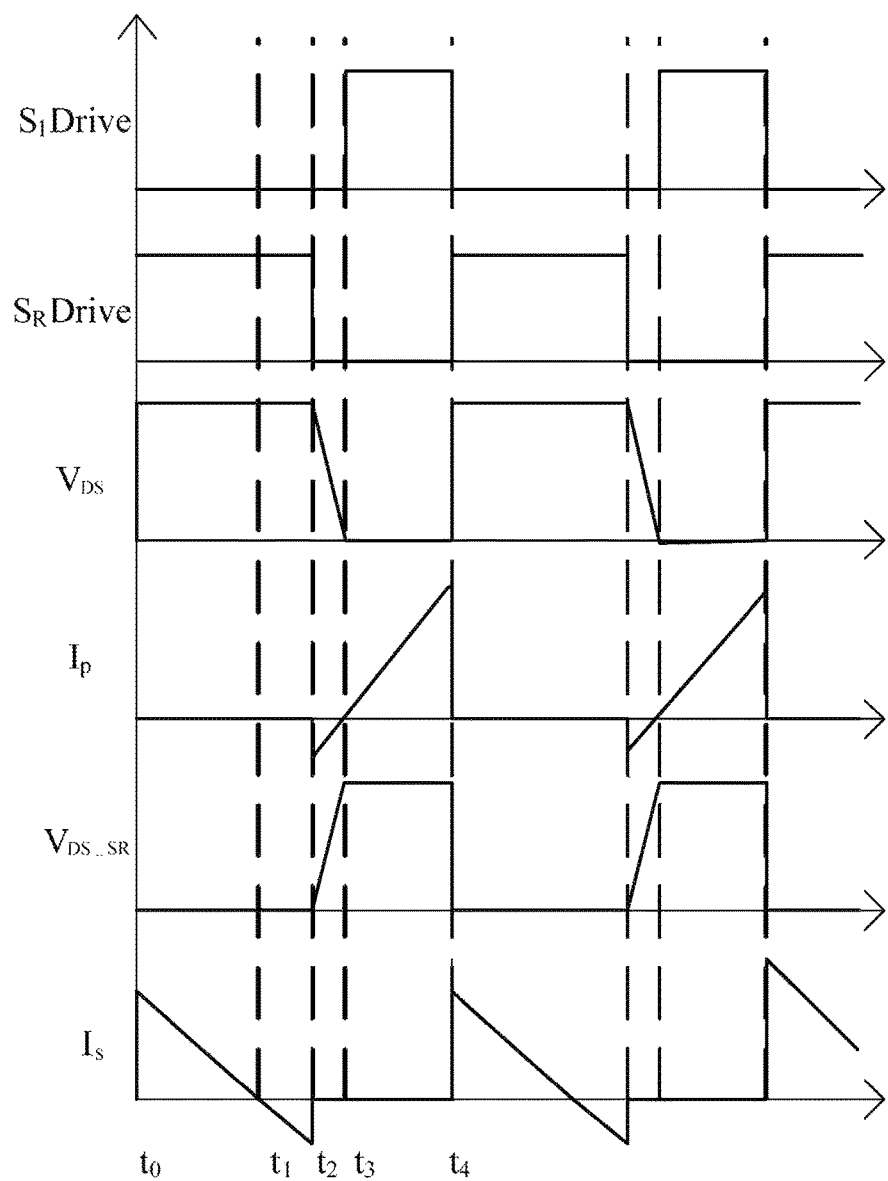
FIG. 4 schematically illustrates a delay conduction waveform diagram of an RCD clamp flyback converter according to a typical structure.

FIG. 3 illustrates a schematic circuit diagram of an RCD clamp flyback converter according to a typical structure, by which zero-voltage switching (ZVS) of the primary-side power switch $S_1$ may be achieved by delaying in turning on a secondary-side synchronous rectifier $S_R$. An exemplary control method for delaying in turning on the secondary-side synchronous rectifier $S_R$ may be implemented by further maintaining, after a secondary-side current $i_s$ of the synchronous rectifier $S_R$ dropping to zero, the synchronous rectifier turn-on for a set time, such as $t_1$-$t_2$ in the control waveform diagram as shown in FIG. 4.

The above two methods for achieving the zero-voltage switching (ZVS) of the primary-side power switch $S_1$ are implemented by controlling the synchronous rectifier $S_R$ or the clamp switch $S_2$ turn-on for a set time, which is applicable to an application scenario where the output voltage is constant.

However, with the development of a power adapter, particularly the promotion of USB-PD Type-C, the application of variable outputs becomes more and more popular. For an application scenario of the variable outputs, the above control mode is not applicable any more. This is because no matter the RCD clamp flyback converter or the active clamp flyback converter has the following basic principle of achieving the zero-voltage switching (ZVS) of the primary-side power switch: before the primary-side power switch $S_1$ is turned on, a negative magnetizing current $I_{m\_n}(t)$ is generated on an magnetizing inductor $L_m$ of a transformer, the zero-voltage switching (ZVS) of the primary-side power switch $S_1$ is achieved by virtue of the negative magnetizing current $I_{m\_n}(t)$, and the magnitude of the negative magnetizing current depends on the following formula:

$$I_{m\_n}(t) = \frac{n}{L_m} V_o t \qquad (1)$$

where $L_m$ is the magnetizing inductance value of the transformer, n is a turn ratio of the transformer, $V_o$ is an output voltage value of the converter, $I_{m\_n}(t)$ is an amplitude of the negative magnetizing current, and t is on-time of the auxiliary switch, e.g. delayed on-time for the synchronous rectifier of the quasi-resonant flyback converter, or on-time for the clamp switch of the active clamp flyback converter.

As can be seen from the above formula, both the magnetizing inductance $L_m$ and the turn ratio n are fixed for a design. When the output voltage $V_o$ is fixed, as can be seen from Formula (1), the on-time t is fixed and the fixed on-time t signifies a fixed amplitude of the negative magnetizing current. Therefore, turning on the synchronous rectifier $S_R$ or the clamp switch $S_2$ for the set time t is applicable to an application scenario where the output voltage is constant. When the output voltage is variable, the fixed on-time t signifies that the amplitude of the negative magnetizing current may vary with the change of the output voltage $V_o$. Taking the application of USB-PD Type-C as an example, the minimum output voltage is 5V, and the maximum output voltage is 20V. When the control method of the fixed on-time is adopted, either one of the following two results may occur.

Result A: If the on-time may exactly satisfy the condition of the zero-voltage switching (ZVS) of the primary-side power switch when the output voltage is 5V, the amplitude of the negative magnetizing current generated in an application scenario where the output voltage is 20V will be four times as much as that in an application scenario where the output voltage is 5V. Extra loss may be introduced by excessively large negative magnetizing current, and thus a negative effect may be applied on the efficiency of the converter.

Result B: If the on-time may exactly satisfy the condition of the zero-voltage switching (ZVS) of the primary-side power switch when the output voltage is 20V, the amplitude of the negative magnetizing current generated in an application scenario where the output voltage is 5V will be only ¼ of that in an application scenario where the output voltage is 20V. The primary-side power switch may be unable to achieve the zero-voltage switching due to excessively small negative magnetizing current.

Figure 6:
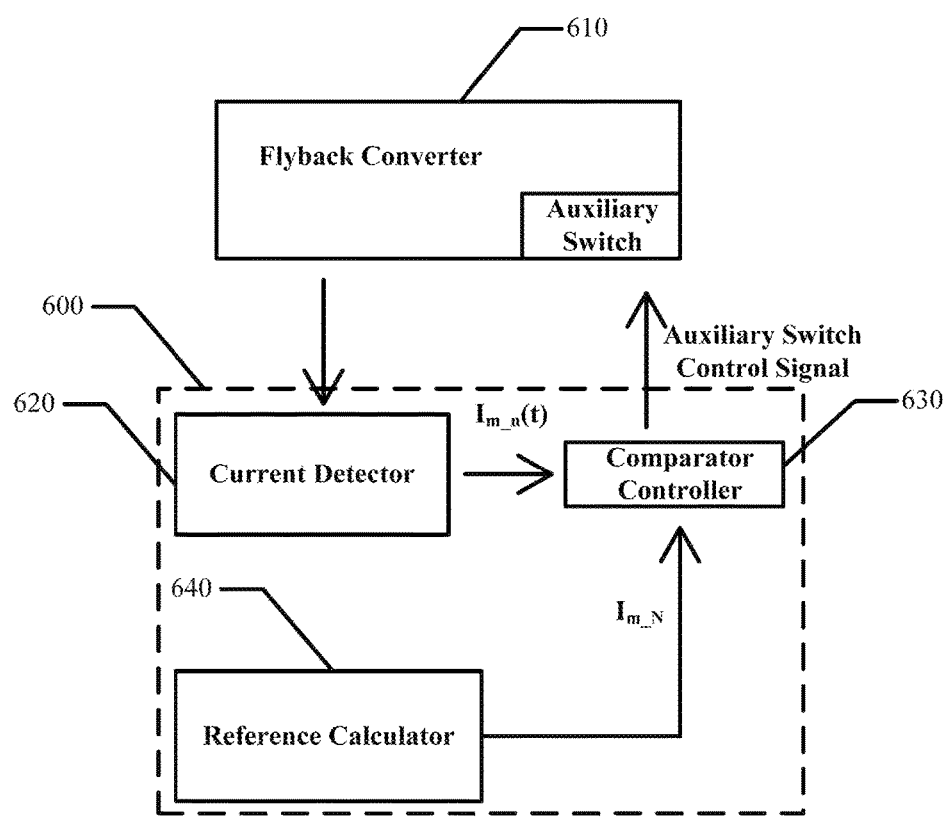
FIG. 6 schematically illustrates a control principle block diagram of a control device according to an exemplary embodiment of the present disclosure.

Based on the above contents, in an exemplary embodiment, there is provided a control device 600, referring to FIG. 6, which is used for controlling a flyback converter 610 including an auxiliary switch. As shown in FIG. 6, the control device 600 may include: a current detector 620 and a comparator controller 630.

The current detector 620 is configured to detect an amplitude of a current of the flyback converter 610 to obtain an amplitude of a negative magnetizing current of the flyback converter 610.

The comparator controller 630 is configured to compare the amplitude of the negative magnetizing current obtained by the current detector 620 with a reference value, and turn off the auxiliary switch according to a comparison result.

According to the control device 600 in this exemplary embodiment, following advantages may be achieved. On the one hand, an amplitude of a negative magnetizing current is obtained by detecting an amplitude of a current of the flyback converter 610, such that the amplitude of the negative magnetizing current with different outputs may be obtained. On the other hand, the obtained amplitude of the negative magnetizing current is compared with a reference value, and auxiliary switch is turned off according to a comparison result, such that zero-voltage switching of a primary-side switch with different outputs may be achieved by reasonably setting the reference value.

In this exemplary embodiment, the flyback converter 610 further includes a primary-side switching circuit, a secondary-side rectifier, a transformer, and an output capacitor (not shown). The primary-side switching circuit includes a primary-side power switch, the secondary-side rectifier includes a first end and a second end, where the first end and the second end are electrically connected to the transformer and the output capacitor respectively. Before the primary-side power switch is turned on, the flyback converter 610 is caused to generate a negative magnetizing current by turning on and turning off the auxiliary switch. The reference value is set, and amplitude information of the negative magnetizing current is obtained by detecting the current of the flyback converter. When the amplitude of the negative magnetizing current is greater than or equal to the reference value, the comparator controller 630 outputs a control signal to turn off the auxiliary switch. Afterward, the negative magnetizing current serves as an initial value, and the zero-voltage switching (ZVS) of the primary-side power switch is achieved via resonance of the magnetizing inductor $L_m$ and a parasitic capacitor $C_{EQ}$ of a primary-side circuit. By reasonably setting the reference value of the negative magnetizing current, the zero-voltage switching (ZVS) of the primary-side power switch may be achieved with different outputs within a whole load range and a whole input voltage range. In this embodiment, the parasitic capacitor $C_{EQ}$ consists of a parasitic capacitor of the primary-side power switch S1 and a parasitic capacitor of a primary-side coil of the transformer T.

It is to be noted that in this exemplary embodiment, the output voltage of the flyback converter 610 is variable. For example, the output voltage of the flyback converter 610 may be 5V, 9V, 15V or 20V and so on, which is not specially limited in the present disclosure.

Further, as shown in FIG. 6, the control device 600 may include a reference calculator 640, which is configured to generate the reference value $I_{m\_N}$ according to information on the flyback converter 610.

Figure 5:
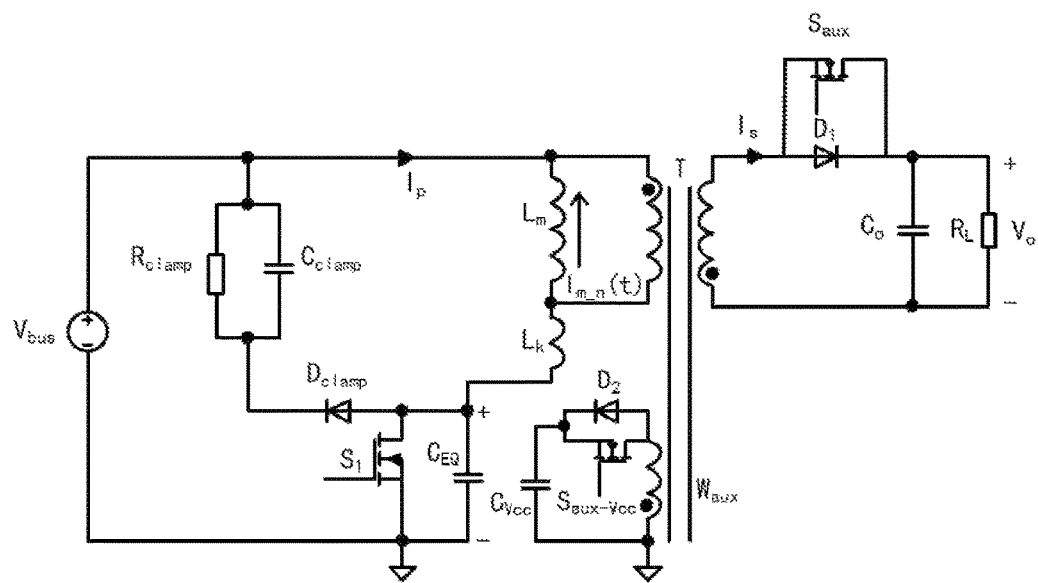
FIG. 5 schematically illustrates a circuit diagram of an RCD clamp flyback converter according to another typical structure.

In addition, in some exemplary embodiments, the flyback converter 610 may be the active clamp flyback converter as shown in FIG. 1 or the RCD clamp flyback converter as shown in FIG. 3 or FIG. 5, but the flyback converter in the exemplary embodiments of the present disclosure is not limited thereto.

Further, in some exemplary embodiments, the auxiliary switch of the flyback converter 610 may be the clamp switch $S_2$ as shown in FIG. 1 or the synchronous rectifier $S_R$ as shown in FIG. 3, but the auxiliary switch in the exemplary embodiments of the present disclosure is not limited thereto. For example, the secondary side as shown in FIG. 5 is the RCD clamp flyback converter with diode rectifier, and the auxiliary switch thereof may be a switch $S_{aux}$ connected in parallel with a diode D1, or the auxiliary switch thereof may be a switch $S_{aux\_VCC}$ connected in series with an auxiliary winding $W_{aux}$.

It is to be noted that in some exemplary embodiments, an operating mode of the flyback converter may be a discontinuous current mode (DCM) or a discontinuous current mode boundary (DCMB), which is not specially limited by the present disclosure.

Figure 7:
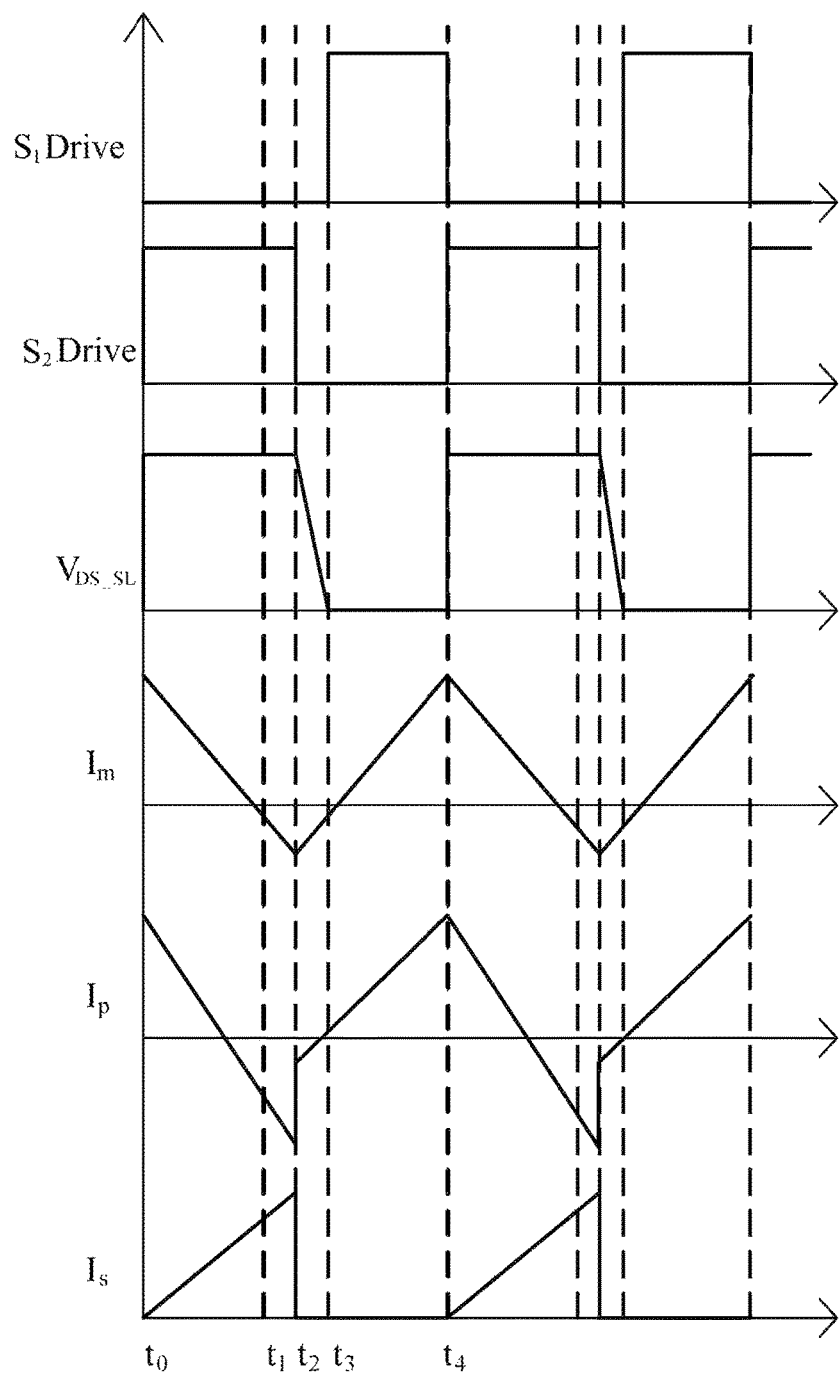
FIG. 7 schematically illustrates a complementary control waveform diagram of an active clamp flyback converter according to still another exemplary embodiment of the present disclosure.

Further, in this exemplary embodiment, when the flyback converter is the active clamp flyback converter as shown in FIG. 1, the auxiliary switch is the clamp switch $S_2$. The negative magnetizing current may be generated by the non-complementary control mode as shown in FIG. 2, or the negative magnetizing current may be generated by the complementary control mode as shown in FIG. 7.

Figure 8:
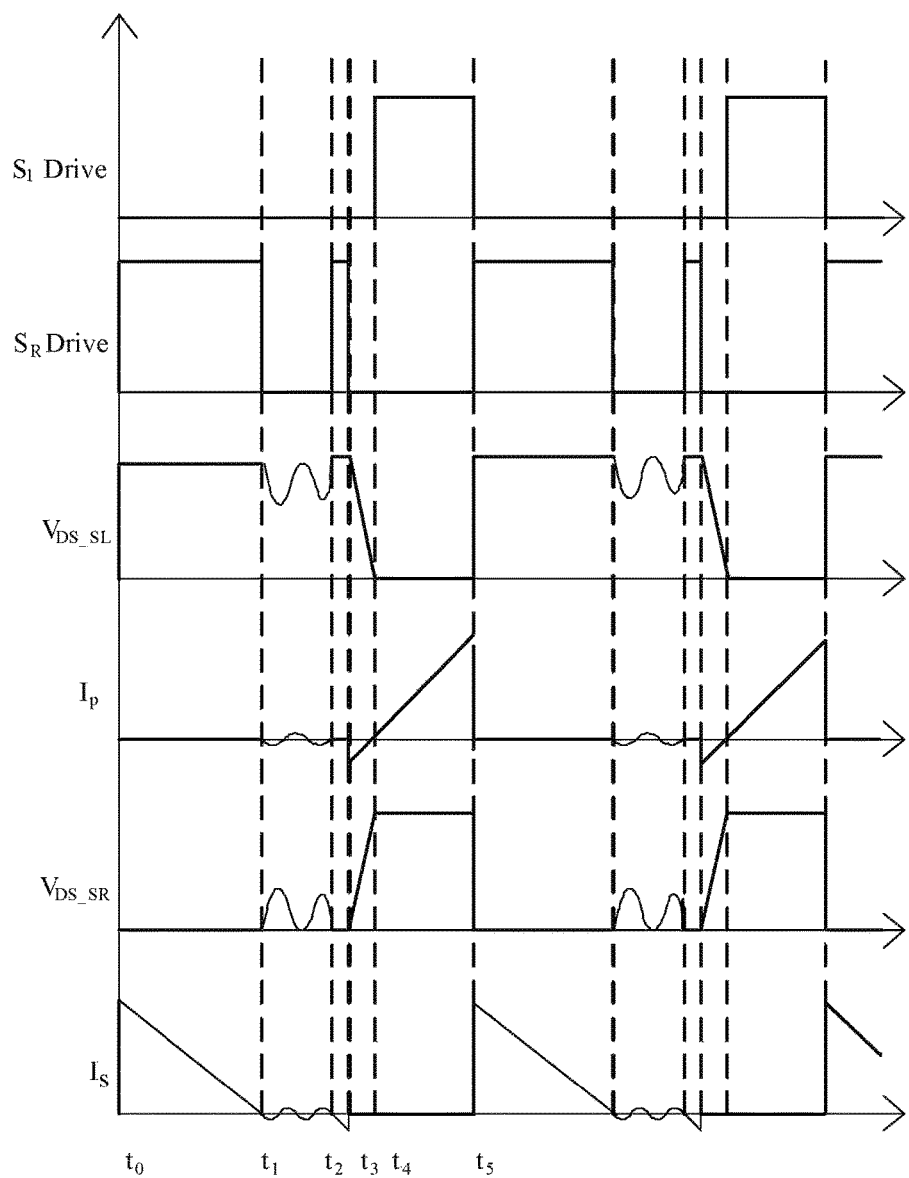
FIG. 8 schematically illustrates a second conduction control waveform diagram of an RCD clamp flyback converter according to still another exemplary embodiment of the present disclosure.

Further, in this exemplary embodiment, when the flyback converter is the RCD clamp flyback converter as shown in FIG. 3, the auxiliary switch is the synchronous rectifier $S_R$. The flyback converter may generate the negative magnetizing current by the delay conduction control mode of synchronous rectifier as shown in FIG. 4. In one embodiment, the negative magnetizing current may be generated by the second conduction control mode of synchronous rectifier as shown in FIG. 8, in which the second conduction refers to the conduction from t2 to t3.

Figure 9:
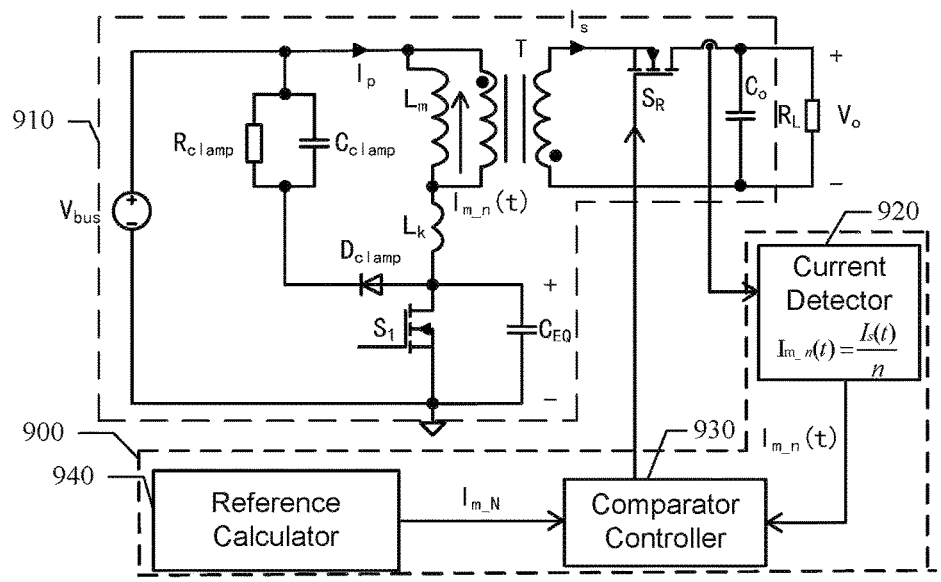
FIG. 9 schematically illustrates a specific embodiment of a method for detecting and controlling a negative magnetizing current of an RCD clamp flyback converter according to still another exemplary embodiment of the present disclosure.

FIG. 9 illustrates a specific embodiment of a control device. As shown in FIG. 9, the control device 900 is configured to control the flyback converter 910. The control device 900 includes: a current detector 920, a comparator controller 930, and a reference calculator 940.

The flyback converter 910 is an RCD clamp flyback converter, including a primary-side switching circuit, a secondary-side rectifier, a transformer T, and an output capacitor $C_o$. The primary-side switching circuit includes a primary-side power switch $S_1$, the secondary-side rectifier includes a synchronous rectifier $S_R$, and the secondary-side rectifier is electrically connected to the transformer T and the output capacitor $C_o$ respectively.

In this embodiment, the current detector 920 receives the amplitude $I_S$ of the current flowing through the synchronous rectifier $S_R$. The current detector 920 obtains the amplitude $I_{m\_n}$ of the negative magnetizing current of a primary-side coil according to the current amplitude $I_S$ of the synchronous rectifier $S_R$, and delivers the amplitude $I_{m\_n}$ of the negative magnetizing current to the comparator controller 930. The comparator controller 930 compares the amplitude $I_{m\_n}$ of the negative magnetizing current with a reference value $I_{m\_N}$ of the reference calculator 940. When the amplitude $I_{m\_n}$ of the negative magnetizing current is greater than or equal to the reference value $I_{m\_N}$, the comparator controller 930 outputs a control signal to turn off the synchronous rectifier $S_R$.

In an exemplary embodiment, reference is made to FIG. 4, FIG. 8 and FIG. 9 for principles of the method for detecting the amplitude of the negative magnetizing current of the RCD clamp flyback converter. When the synchronous rectifier is delayed in turn-on (such as $t_1$~$t_2$ as shown in FIG. 4) or when the synchronous rectifier is turned on twice (namely, the synchronous rectifier $S_R$ is turned on twice within one switching cycle, for example, the first turn-on of $t_0$~$t_1$ and the second turn-on of $t_2$~$t_3$ as shown in FIG. 8), during $t_2$~$t_3$ as shown in FIG. 8, a negative current $I_s$ may be generated on a secondary-side coil of the transformer T. When the synchronous rectifier $S_R$ is turned off, the current is transferred to a primary-side coil, and the negative magnetizing current $I_{m\_n}$ of the primary-side coil is generated. According to a circuit principle, an amplitude $I_{m\_n}$ of a negative magnetizing current of a primary-side coil may be obtained by detecting an amplitude $I_s$ of a current flowing through the secondary-side synchronous rectifier $S_R$, and a specific calculation formula is as below:

$$I_{m\_n}(t) = \frac{I_s(t)}{n} \quad (2)$$

where $I_{m\_n}$ denotes the amplitude of the negative magnetizing current, $I_s$ denotes the amplitude of the current flowing through the synchronous rectifier, and n denotes the turn ratio of the transformer.

In other embodiments, detection of the amplitude of the current flowing through the synchronous rectifier $S_R$ may be achieved via a current transformer, an on-state resistance of the synchronous rectifier, or a sampling resistor.

Figure 10:
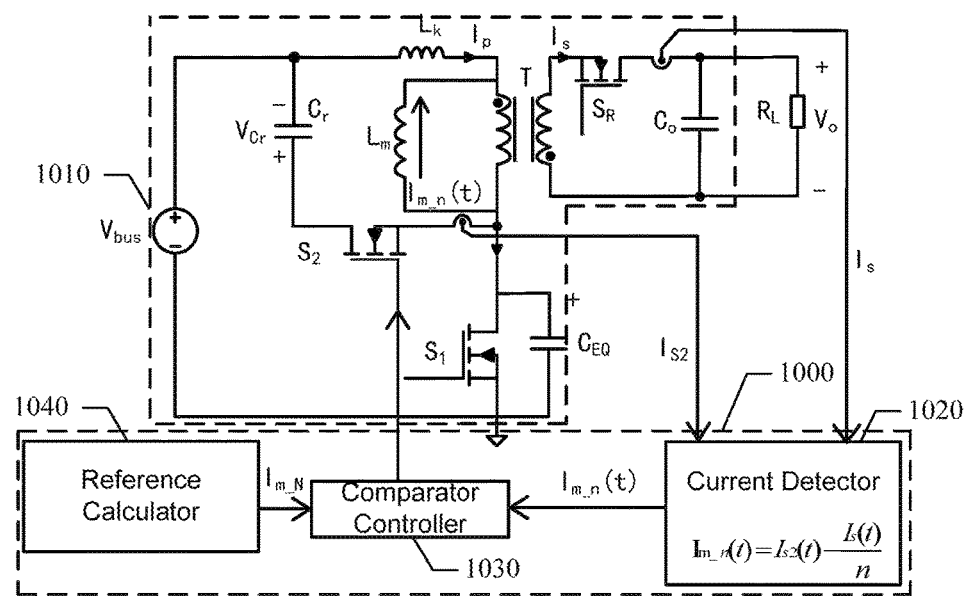
FIG. 10 schematically illustrates a specific embodiment of a method for detecting and controlling a negative magnetizing current of an active clamp flyback converter according to still another exemplary embodiment of the present disclosure.

FIG. 10 is another specific embodiment of a control device. As shown in FIG. 10, the control device 1000 is configured to control the flyback converter 1010. The control device 1000 includes: a current detector 1020, a comparator controller 1030, and a reference calculator 1040.

The flyback converter 1010 is an active clamp flyback converter, including a primary-side switching circuit, a secondary-side rectifier, a transformer T and an output capacitor $C_o$. The primary-side switching circuit includes a primary-side power switch $S_1$ and a clamp switch $S_2$, the secondary-side rectifier includes a synchronous rectifier $S_R$, and the secondary-side rectifier is electrically connected to the transformer T and the output capacitor $C_o$ respectively.

In this embodiment, the current detector 1020 receives the detected amplitude $I_{S2}$ of the current flowing through the clamp switch $S_2$, and receives the detected amplitude $I_S$ of the current flowing through a secondary rectifier. The current detector 1020 obtains an amplitude $I_{m\_n}$ of the negative magnetizing current according to the current amplitudes $I_{S2}$ and the $I_S$, and delivers the amplitude $I_{m\_n}$ to the comparator controller 1030. The comparator controller 1030 compares the amplitude $I_{m\_n}$ of the negative magnetizing current with a reference value $I_{m\_N}$ of the reference calculator 1040. When the amplitude $I_{m\_n}$ of the negative magnetizing current is greater than or equal to the reference value $I_{m\_N}$, the comparator controller 1030 outputs a control signal to turn off the clamp switch $S_2$.

Figure 11:
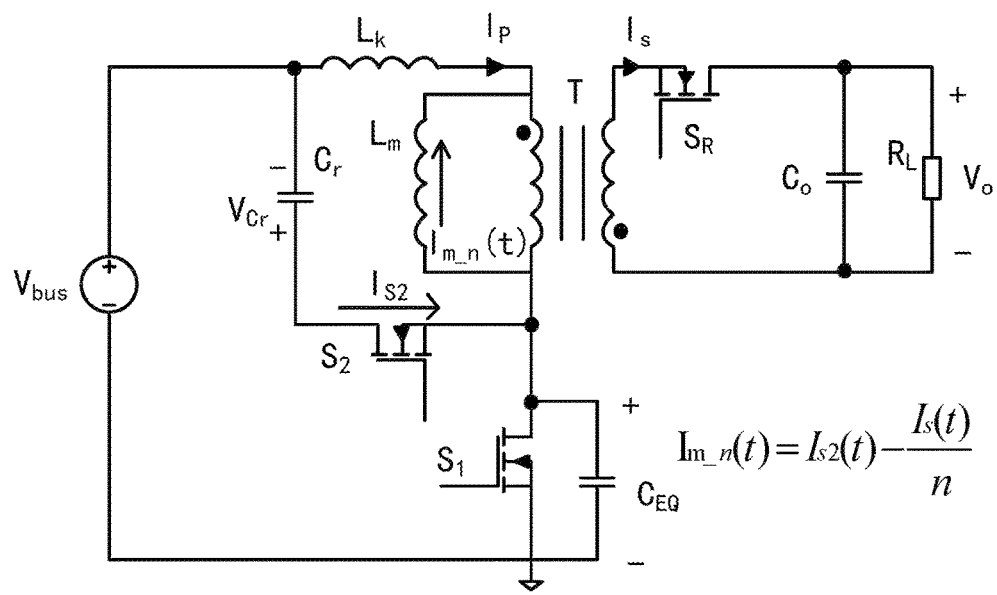
FIG. 11 schematically illustrates a schematic diagram of detecting a negative magnetizing current of an active clamp flyback converter according to still another exemplary embodiment of the present disclosure.

In an embodiment, the active clamp flyback converter may adopt a non-complementary control mode (such as $t_3$~$t_4$ as shown in FIG. 2) and a complementary control mode (such as $t_1$~$t_2$ as shown in FIG. 7). No matter which control mode is adopted by the active clamp flyback converter, principles of the method for detecting the amplitude of the negative magnetizing current are as below: referring to FIG. 2, FIG. 7 and FIG. 11, when the clamp switch is turned on, and the amplitude $I_{m\_n}$ of the negative magnetizing current may be indirectly obtained by detecting the amplitude $I_{S2}$ of the current flowing through the clamp switch and the amplitude $I_S$ of the current flowing through the secondary-side rectifier, and a specific calculation formula is as below:

$$I_{m\_n}(t) = I_{S2}(t) - \frac{I_s(t)}{n} \quad (3)$$

where $I_{m\_n}$ denotes the amplitude of the negative magnetizing current, $I_{S2}$ denotes the amplitude of the current flowing through the clamp switch, $I_s$ denotes the amplitude of the current flowing through the secondary-side rectifier, and the n denotes the turn ratio of the transformer.

It is to be noted that in other exemplary embodiments of the present disclosure, detection of the amplitude of the current flowing through the clamp switch $S_2$ and the amplitude of the current flowing through the secondary-side rectifier may be achieved via a current transformer, a sampling resistor, or an on-state resistance of a power device, which is not specially limited in the present disclosure. For example, the amplitude $I_{S2}$ of the current flowing through the clamp switch may be detected via the current transformer, the sampling resistor, or the on-state resistance of the clamp switch; and the amplitude $I_S$ of the current flowing through the secondary-side rectifier of the flyback converter may be detected via the current transformer, the sampling resistor, or the on-state resistance of the secondary-side rectifier.

In addition, in some exemplary embodiments of the present disclosure, the control device further includes a reference calculator 940 or a reference calculator 1040, which is configured to set the reference value $I_{m\_N}$. For setting the reference value, in case of low voltage input ($V_{bus} < nV_o$), the zero-voltage switching (ZVS) of a primary-side power switch may be achieved without the aid of the negative magnetizing current; and in case of high voltage input ($V_{bus} > nV_o$), to achieve the zero-voltage switching (ZVS) of the primary-side power switch, the minimum amplitude of the negative magnetizing current may satisfy the formula (4):

$$I_{m\_N} > \frac{\sqrt{V_{bus}^2 - (nV_o)^2}}{\sqrt{L_m/C_{EQ}}} \quad (4)$$

where $I_{m\_N}$ denotes the reference value, $V_{bus}$ denotes an input voltage, and $C_{EQ}$ denotes a parasitic capacitance value.

According to the above Formula (4), for a concrete circuit design, the turn ratio n, the magnetizing inductance $L_m$ and the parasitic capacitance $C_{EQ}$ are fixed. To achieve the zero-voltage switching (ZVS) of the primary-side power switch, the reference value $I_{m\_N}$ is dependent on the input voltage $V_{bus}$ and the output voltage $V_O$. Thus, the reference calculator may adjust the reference value $I_{m\_N}$ dependent on the input voltage $V_{bus}$ and the output voltage $V_O$ of the flyback converter.

However, to adjust the reference value $I_{m\_N}$, two variables need to be monitored when the above method is used: the input voltage $V_{bus}$ and the output voltage $V_O$, which makes the above control so complex. The effect of the output voltage on the reference value may be neglectable when the flyback converter operates in case of high voltage input ($V_{bus} > nV_o$). That is, the reference value is merely related to the input voltage, and thus setting the reference value may be greatly simplified.

$$I_{m\_N} > \frac{V_{bus}}{\sqrt{L_m/C_{EQ}}} \quad (5)$$

Thus, the reference calculator may set the reference value $I_{m\_N}$ based on the input voltage $V_{bus}$ of the flyback converter.

In some embodiments, there may be two methods for setting the reference value as below.

In a method for setting a fixed reference value, to achieve the zero-voltage switching (ZVS) of the primary-side power switch within a whole input voltage range, the reference value is set according to the maximum input voltage, namely:

$$I_{m\_N} = \frac{V_{bus\_max}}{\sqrt{L_m/C_{EQ}}} \quad (6)$$

where $V_{bus\_max}$ denotes the maximum value of the input voltage.

As to the method for setting a fixed reference value, when the bus voltage is the maximum value, the zero-voltage switching (ZVS) of the primary-side power switch may be exactly satisfied. However, when the input voltage is a low voltage, the amplitude of the negative magnetizing current generated by this control method is greater than the amplitude of the negative magnetizing current required for achieving the zero-voltage switching (ZVS) of the primary-side power switch, by which extra loss may be caused and thus the efficiency optimization may be impacted. The method for setting a fixed reference value may be used in an application scenario where efficiency requirements are not so critical.

For an application scenario where the efficiency requirements are critical, a method for setting a reference value varying with the input voltage may be employed to optimize the efficiency of the converter. Therefore, the reference value may be set as:

$$I_{m\_N}(V_{bus}) = \frac{V_{bus}}{\sqrt{L_m/C_{EQ}}} \quad (7)$$

Figure 12:
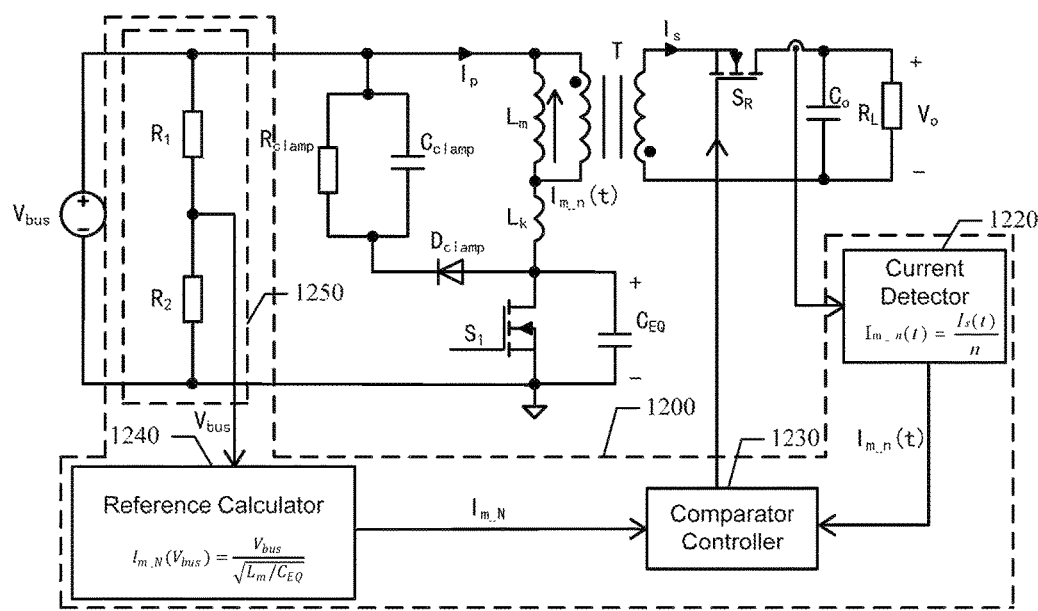
FIG. 12 schematically illustrates a method for setting a reference value of an RCD clamp flyback converter that varies with an input voltage according to still another exemplary embodiment of the present disclosure.
Figure 13:
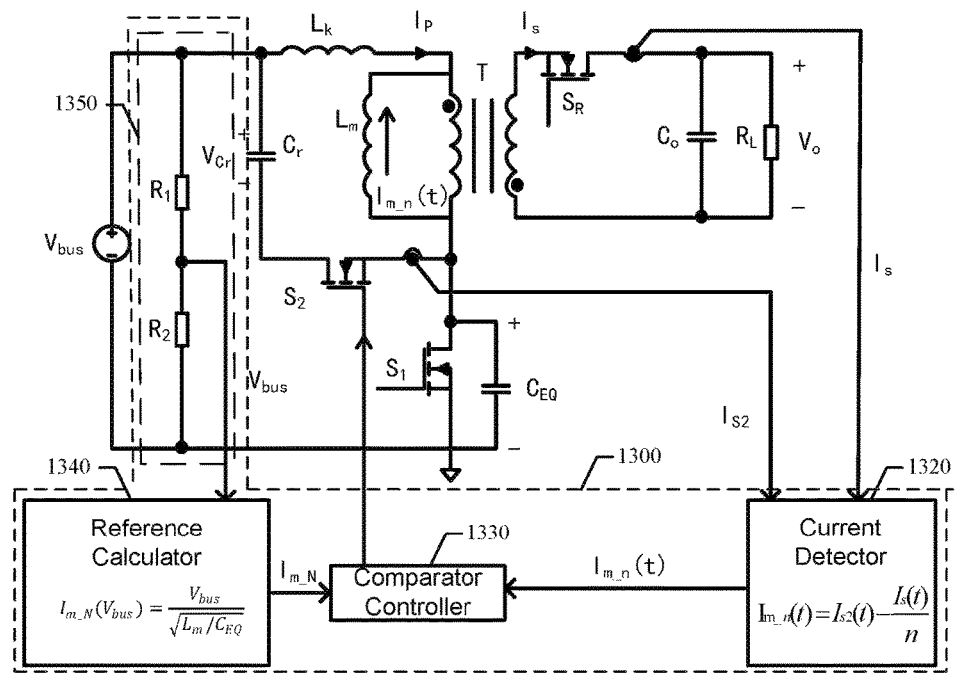
FIG. 13 schematically illustrates a method for setting a reference value of an active clamp flyback converter that varies with an input voltage according to still another exemplary embodiment of the present disclosure.

For a certain circuit design, the magnetizing inductance $L_m$ and the parasitic capacitance $C_{EQ}$ are fixed. As can be known from the above Formula (7), the reference value $I_{m\_N}$ is proportional to the input voltage $V_{bus}$, and the reference calculator may directly calculate the reference value $I_{m\_N}$ according to the input voltage value $V_{bus}$ detected by an input voltage detector. As shown in FIG. 12 and FIG. 13, an input voltage $V_{bus}$ signal is detected by an input voltage detector. Specifically, the input voltage detector may be a resistance voltage dividing network; and the input voltage $V_{bus}$ signal is scaled to a required reference value by a proportion calculator.

FIG. 12 illustrates still another specific embodiment of a control device. The structure in FIG. 12 is similar to that in FIG. 9, but the structure in FIG. 12 further includes a specific example of the reference calculator. As shown in FIG. 12, the control device 1200 further includes an input voltage detector 1250. In this embodiment, the input voltage detector 1250 includes a first resistor $R_1$ and a second resistor $R_2$. The input voltage information $V_{bus}$ is detected by dividing voltage of the first resistor $R_1$ and the second resistor $R_2$. The input voltage detector 1250 transmits the input voltage information $V_{bus}$ to a reference calculator 1240 to output a reference value $I_{m\_N}$, which is delivered to a comparator controller 1230. The current detector 1220 receives a detected amplitude $I_S$ of the current flowing through the synchronous rectifier, obtains the amplitude $I_{m\_n}$ of the negative magnetizing current according to the current amplitude $I_S$, and delivers the amplitude $I_{m\_n}$ to a comparator controller 1230. The comparator controller 1230 compares the amplitude $I_{m\_n}$ of the negative magnetizing current obtained by the current detector 1220 with a reference value $I_{m\_N}$ of the reference calculator 1240. When the $I_{m\_n}$ is greater than or equal to the reference value $I_{m\_N}$, the comparator controller 1230 outputs a control signal to turn off the synchronous rectifier $S_R$.

FIG. 13 illustrates still another specific embodiment of a control device. The structure in FIG. 13 is similar to that in FIG. 10, but the structure in FIG. 13 further includes another example of the reference calculator. As shown in FIG. 13, the control device 1300 further includes an input voltage detector 1350. In this embodiment, the input voltage detector 1350 includes a first resistor $R_1$ and a second resistor $R_2$. The input voltage information $V_{bus}$ is detected by way of resistance voltage division. The input voltage detector 1350 transmits the input voltage information $V_{bus}$ to a reference calculator 1340 to output a reference value $I_{m\_N}$. The current detector 1320 receives a detected amplitude $I_{S2}$ of the current flowing through the clamp switch $S_2$, and receives the amplitude $I_S$ of the current flowing through the secondary rectifier. The current detector 1320 obtains the amplitude $I_{m\_n}$ of the negative magnetizing current according to the current amplitudes $I_{S2}$ and the $I_S$, and delivers the amplitude $I_{m\_n}$ of the negative magnetizing current to a comparator controller 1330. The comparator controller 1330 compares the amplitude $I_{m\_n}$ of the negative magnetizing current with a reference value $I_{m\_N}$ of the reference calculator 1340. When the $I_{m\_n}$ is greater than or equal to the reference value $I_{m\_N}$, the comparator controller 1330 outputs a control signal to turn off the clamp switch $S_2$.

Figure 14:
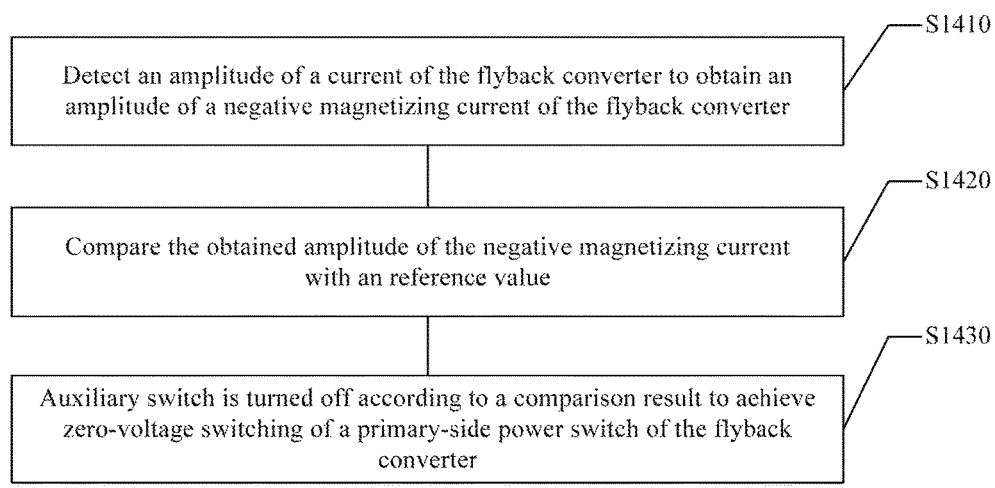
FIG. 14 schematically illustrates a flowchart of a control method according to still another exemplary embodiment of the present disclosure.

In addition, in an exemplary embodiment, there is further provided a control method, which may be applied to the flyback converter as shown in FIG. 6-FIG. 13. The flyback converter includes an auxiliary switch. Referring to FIG. 14, the control method may include following steps.

In step S1410, an amplitude of a current of the flyback converter is detected to obtain an amplitude of a negative magnetizing current of the flyback converter.

In step S1420, the obtained amplitude of the negative magnetizing current is compared with a reference value.

In step S1430, the auxiliary switch is turned off according to a comparison result to achieve zero-voltage switching of a primary-side power switch of the flyback converter.

On the one hand, the amplitude of the negative magnetizing current is obtained by detecting the amplitude of the current of the flyback converter, such that the amplitude of the negative magnetizing current with different outputs may be acquired. On the other hand, the acquired amplitude of the negative magnetizing current is compared with a reference value, and turn-off of the auxiliary switch is controlled according to a comparison result, such that zero-voltage switching of the primary-side switch with different outputs within a whole input voltage range (such as 90~264 Vac) may be achieved by reasonably setting the reference value.

Further, in some exemplary embodiments, the control method may further include: turning off the auxiliary switch when the amplitude of the negative magnetizing current is greater than or equal to the reference value.

Further, in some exemplary embodiments, the control method may further include: setting the reference value based on an input voltage of the flyback converter.

Further, in some exemplary embodiments, setting the reference value based on an input voltage of the flyback converter may include: setting the reference value based on the maximum value of the input voltage of the flyback converter.

Furthermore, in some exemplary embodiments, the control method may further include: setting the reference value based on the input voltage of the flyback converter and an output voltage of the flyback converter.

Further, in some exemplary embodiments, when the auxiliary switch is a synchronous rectifier, the control method further includes: generating the negative magnetizing current in the flyback converter by means of a delay conduction control mode or a second conduction control mode.

Further, in some exemplary embodiments, when the auxiliary switch is a synchronous rectifier, the detecting the amplitude of the current of the flyback converter may include: detecting the amplitude of the current flowing through the synchronous rectifier by means of a current transformer, a sampling resistor, or an on-state resistance of the synchronous rectifier.

Further, in some exemplary embodiments, when the auxiliary switch is a clamp switch, the control method further includes: generating the negative magnetizing current in the flyback converter by means of a complementary control mode or a non-complementary control mode.

Further, in some exemplary embodiments, when the auxiliary switch is a clamp switch, the detecting an amplitude of a current of the flyback converter may include:

detecting the amplitude of the current flowing through the clamp switch by means of a current transformer, a sampling resistor, or an on-state resistance of the clamp switch; and detecting the amplitude of the current flowing through a secondary-side rectifier by means of another current transformer, another sampling resistor, or an on-state resistance of the secondary-side rectifier.

Further, in some exemplary embodiments, to achieve zero-voltage switching of the primary-side power switch of the flyback converter may include: achieving the zero-voltage switching of the primary-side power switch of the flyback converter via resonance of a magnetizing inductor and a parasitic capacitor in the flyback converter.

Each step in the control method of this exemplary embodiment corresponds, one to one, to functions of each unit or module in the control device, and thus is not unnecessarily elaborated herein.

Furthermore, another exemplary embodiment of the present disclosure provides a switching power supply, which may include the control device according to any one of the preceding embodiments. The switching power supply of this exemplary embodiment adopts the control device, and thus at least has all the corresponding advantages of the control device.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within prior art. It is intended that the specification and embodiments be considered as exemplary only, with a scope of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only restricted by the appended claims.

What is claimed is:

1. A control device, applied to a flyback converter comprising an auxiliary switch, comprising:
    a current detector configured to detect an amplitude of a current of the flyback converter to obtain an amplitude of a negative magnetizing current of the flyback converter;
    a comparator controller configured to compare the amplitude of the negative magnetizing current obtained by the current detector with a reference value, and turn off the auxiliary switch according to a comparison result; and
    a reference calculator configured to set the reference value based on an input voltage of the flyback converter.

2. The control device according to claim 1, wherein the auxiliary switch comprises any one selected from a group comprising a synchronous rectifier, a clamp switch, a switch connected in parallel with a secondary-side rectifier of the flyback converter, and a switch connected in series with an auxiliary winding of the flyback converter.

3. The control device according to claim 2, wherein the auxiliary switch comprises the synchronous rectifier, and the comparator controller is configured to detect the amplitude of the current of the flyback converter by detecting an amplitude of a current flowing through the synchronous rectifier.

4. The control device according to claim 2, wherein the auxiliary switch comprises the clamp switch, and the comparator controller is configured to detect the amplitude of the current of the flyback converter by detecting an amplitude of a current flowing through the clamp switch; and detecting an amplitude of a current flowing through a secondary-side rectifier.

5. The control device according to claim 1, wherein the comparator controller is configured to turn off the auxiliary switch when the amplitude of the negative magnetizing current is greater than or equal to the reference value.

6. The control device according to claim 1, wherein the flyback converter comprises a Resistor Capacitor Diode (RCD) clamp flyback converter or an active clamp flyback converter.

7. The control device according to claim 6, wherein an operating mode of the flyback converter comprises a discontinuous current mode or a discontinuous current mode boundary.

8. The control device according to claim 6, wherein an operating mode of the RCD clamp flyback converter comprises a delay conduction control mode or a second conduction control mode; and an operating mode of the active clamp flyback converter comprises a complementary control mode or a non-complementary control mode.

9. The control device according to claim 1, wherein an output voltage of the flyback converter is variable.

10. The control device according to claim 9, wherein the output voltage of the flyback converter comprises 5V, 9V, 15V or 20V.

11. The control device according to claim 1, further comprising:
the reference calculator is further configured to set the reference value based on the input voltage of the flyback converter and an output voltage of the flyback converter.

12. A switching power supply, comprising a control device applied to a flyback converter comprising an auxiliary switch, wherein the control device comprises:
a current detector configured to detect an amplitude of a current of the flyback converter to obtain an amplitude of a negative magnetizing current of the flyback converter;
a comparator controller configured to compare the amplitude of the negative magnetizing current obtained by the current detector with a reference value, and turn off the auxiliary switch according to a comparison result; and
a first reference calculator configured to set the reference value based on an input voltage of the flyback converter.

13. A control method, applied to a flyback converter comprising an auxiliary switch, comprising:
detecting an amplitude of a current of the flyback converter to obtain an amplitude of a negative magnetizing current of the flyback converter;
setting a reference value based on an input voltage of the flyback converter, and comparing the amplitude of the negative magnetizing current with the reference value; and
turning off the auxiliary switch according to a comparison result to achieve zero-voltage switching of a primary-side power switch of the flyback converter.

14. The control method according to claim 13, wherein the auxiliary switch comprises any one selected from a group comprising a synchronous rectifier, a clamp switch, a switch connected in parallel with a secondary-side rectifier of the flyback converter, and a switch connected in series with an auxiliary winding of the flyback converter.

15. The control method according to claim 14, wherein the auxiliary switch comprises the synchronous rectifier, and the control method further comprises:
generating the negative magnetizing current in the flyback converter by means of a delay conduction control mode or a second conduction control mode.

16. The control method according to claim 14, wherein the auxiliary switch comprises the synchronous rectifier, and the detecting an amplitude of a current of the flyback converter comprises:
detecting an amplitude of a current flowing through the synchronous rectifier.

17. The control method according to claim 14, wherein the auxiliary switch comprises the clamp switch, and the control method further comprises:
generating the negative magnetizing current in the flyback converter by means of a complementary control mode or a non-complementary control mode.

18. The control method according to claim 14, wherein the auxiliary switch comprises the clamp switch, and the detecting an amplitude of a current of the flyback converter comprises:
detecting an amplitude of a current flowing through the clamp switch; and detecting an amplitude of a current flowing through the secondary-side rectifier.

19. The control method according to claim 13, wherein the turning off the auxiliary switch according to a comparison result to achieve zero-voltage switching of a primary-side power switch of the flyback converter comprises:
turning off the auxiliary switch when the amplitude of the negative magnetizing current is greater than or equal to the reference value.

20. The control method according to claim 13, wherein the flyback converter comprises a Resistor Capacitor Diode (RCD) clamp flyback converter or an active clamp flyback converter.

21. The control method according to claim 20, wherein an operating mode of the flyback converter comprises a discontinuous current mode or a discontinuous current mode boundary.

22. The control method according to claim 20, wherein an operating mode of the RCD clamp flyback converter comprises a delay conduction control mode or a second conduction control mode; and an operating mode of the active clamp flyback converter comprises a complementary control mode or a non-complementary control mode.

23. The control method according to claim 13, further comprising:
achieving the zero-voltage switching of the primary-side power switch of the flyback converter by means of resonance of a magnetizing inductor and a parasitic capacitor in the flyback converter.

24. The control method according to claim 13, wherein an output voltage of the flyback converter is variable.

25. The control method according to claim 24, wherein the output voltage of the flyback converter comprises 5V, 9V, 15V or 20V.

26. The control method according to claim 13, wherein the setting a reference value based on an input voltage of the flyback converter comprises:
setting the reference value based on a maximum value of the input voltage of the flyback converter.

27. The control method according to claim 13, wherein the setting a reference value based on an input voltage of the flyback converter comprises:

setting the reference value based on the input voltage of the flyback converter and an output voltage of the flyback converter.

* * * * *